Feb. 11, 1969  RYOSUKE KIKUKAWA  3,426,803
SUBMERGED FLOATABLE HOSES FOR TRANSPORTING
OIL AND OTHER LIQUIDS ON THE SEA
Original Filed Feb. 6, 1964  Sheet 1 of 2
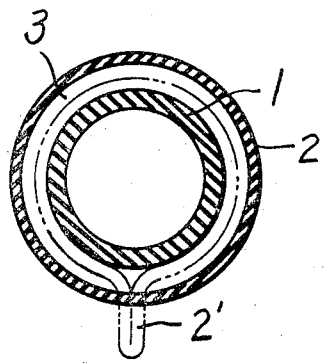
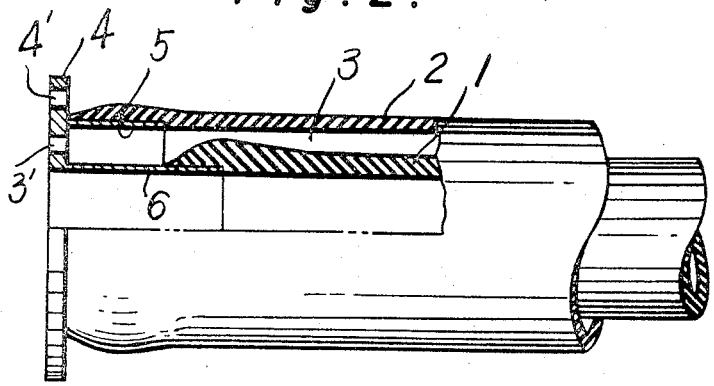
INVENTOR
Ryosuke Kikukawa
BY Stevens, Davis, Miller & Mosher
ATTORNEYS INVENTOR
Ryosuke Kikukawa
BY Stevens, David, Miller & Mosher
ATTORNEYS United States Patent Office 3,426,803
Patented Feb. 11, 1969

3,426,803
SUBMERGED FLOATABLE HOSES FOR TRANS-
PORTING OIL AND OTHER LIQUIDS ON
THE SEA
Ryosuke Kikukawa, Yokohama, Japan, assignor to
Bridgestone Tire Company Limited, Tokyo, Japan,
a corporation of Japan
Original application Feb. 6, 1964, Ser. No. 342,900, now
Patent No. 3,346,015, dated Oct. 10, 1967. Divided
and this application Apr. 24, 1967, Ser. No. 633,090
Claims priority, application Japan, Feb. 13, 1963,
38/9,045, 38/9,046
U.S. Cl. 138—114                          4 Claims
Int. Cl. F16l 9/12, 11/12; B65b 27/24

ABSTRACT OF THE DISCLOSURE

A submergible and floatable hose pipe for transporting liquid comprising two coaxially positioned flexible hoses forming a sealed annular air space therebetween, the inner hose serving as a liquid carrier, the outer hose maintaining said air space between the said hoses to form a floatation means, a coupling means on each end of said hose pipe comprising a sleeve connected to the end of the inner hose and a flange to be connected to the flange of other hose pipe, and means for introducing fluid into the air space.

---

The present application is a division of my application Ser. No. 342,900 filed Feb. 6, 1964 now U.S. Patent 3,346,015, granted Oct. 10, 1967.

The present invention relates to a normally submerged hose which can be floated on the sea, if necessary, for transporting oil and other liquids, mainly for loading or landing such liquids to and from a ship and a storage station.

The principal object of the invention is to obviate the heretofore usually unavoidable troubles caused in loading or landing a large quantity of oil and other liquids from a ship to the storage tank on the wharf or vice versa and to facilitate easy operation and control of such hose for transporting an extraordinary large quantity of oil and other liquids.

Owing to the recent development of petroleum chemical industries, import and export of oils such as petroleum and the like between inland and foreign countries have been considerably increased but almost all transportation of a large quantity of oil is occupied by the ship transportation.

Due to the transportation by ships, loading and landing are usually carried out by using hoses on the sea or river and the following two processes have heretofore been used.

(1) By connecting a ship and wharf by means of a hose for loading and landing of oil. In this case, the hose is usually kept floating on the surface of the sea by means of a suitable floater and the like means.

(2) Owing to a large quantity of oil transported, the ships have become larger so that they are obliged to anchor at a great distance from the wharf. In this case, the hose for transportation is usually submerged and fixed to the bottom of the sea.

The above-described two processes have sufficiently fulfilled their object for normal use, but owing to the super enlargement of the size of ships in order to cope with the increased large quantity transportation required and by the scattered location of oil storage stations, the heretofore known processes have resulted in other troubles.

That is, according to the process (1), it is not suitable for long distance transportation and moreover by leaving the hose floating all day on the sea surface, the hose is liable to be damaged by wave action and also it disturbs the navigational course of other ships. According to the second process, once submerged and fixed the hose is impossible to be shifted to another storage station located in a remote place which means each storage station needs its own installation.

The object of the invention is to obviate the above disadvantages. The invention is characterized in a normally submerged hose which can be floated, if necessary, on the surface of the sea for use and when the loading or landing of oil has been completed, it is submerged to the bottom of the sea. It has the advantage that it can be easily shifted as desired between the detached storage stations.

The invention will now be described more fully with reference to the accompanying drawings, in which:

FIG. 1 is a cross-sectional view of a hose embodying the invention;

FIG. 2 is a side view partly in section of the hose embodying the invention showing the construction of the joint portion;

Referring to FIG. 1, the hose embodying the invention consists of two concentric hoses, a central hose 1 of which is used for transporting oil or other liquids and the outer hose 2 serves, together with hose 1, as the floating member. The hoses are made of rubber reinforced with fibers or wires so as to be flexible and to enable the transportation of oil and other liquids in the inner hose. The outer hose 2 constituting the floater is made of high strength materials having good weatherproof and seawater proof characteristics, is flexible in case of interchanging between air and water for the purpose of adjusting weight of the hose pipe and also is flexible and deformable in case of using air for floating for the purpose of adjusting volume of the hose pipe. The interspace 3 between two hoses 1 and 2 is used to receive air for floating the hose or receive water for submerging the hose.

Figure 3:
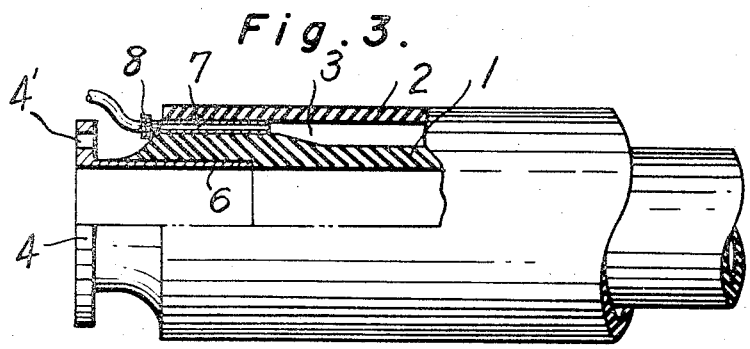
FIG. 3 is a side view similar to FIG. 2 illustrating a modification of the joint portion.

In order to maintain the double structure consisting of the hose member and floater hose in concentric relation and also in order to facilitate the feeding and discharging of air or water into the space 3, a special metallic joint, as shown in FIG. 2, is used or the hose is made of a special construction as shown in FIG. 3.

The metallic joint of special construction shown in FIG. 2 consists of a flange 4 having double sleeves 5 and 6, of which the sleeve 5 is to be connected to the floater hose 2 whilst the sleeve 6 is to be connected to the hose member 1 for oil transportation. An opening 3' serves for introducing or discharging air or water into the space 3 by means of a pump (not shown) and 4' represents a bolt hole for connecting the flange with each other.

In the embodiment of the invention shown in FIG. 3, a metallic flange joint 4 having an ordinary single sleeve 6 is connected to the inner hose 1. Between the inner and outer hoses a pipe 7 is provided for feeding in or sucking out the air into or out of the space 3 by a pump (not shown) or similarly the air in the space 3 may be replaced with water for submerging the hose. The pipes 7 may be connected with each other or to a necessary pipe by means of a joint piece 8.

According to the invention, the pipe can be so designed that, when the space 3 between the inner and outer hoses 1 and 2 is filled with air, the hose can be kept floating on the sea surface during transportation of oil, whilst if the air in the space 3 is replaced with water the hose can be submerged underneath the sea level and it can be kept at a desired depth in the sea by adjusting the quantity of water to be replaced with air or the amount of air to be sucked out of the space 3 by means of a pump. Thus the hose of the invention brings useful effects in the transportation of oil and other liquids.

Figure 4:
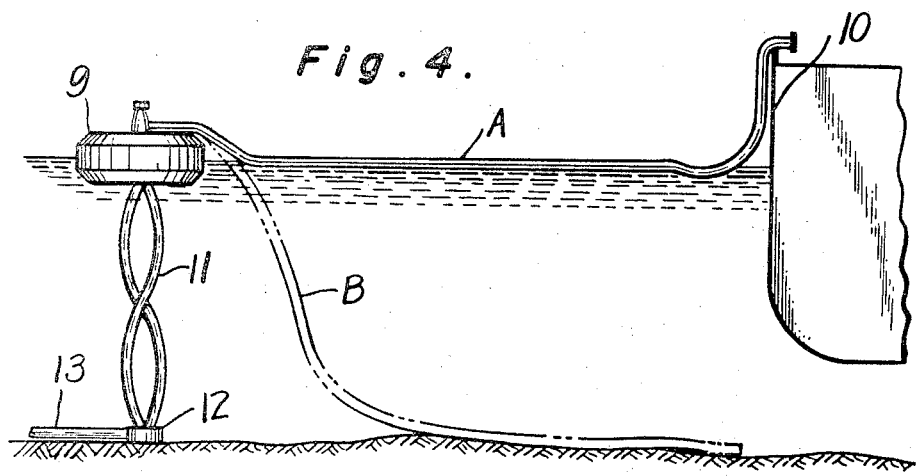
FIG. 4 is a diagrammatic view showing the condition when the hose of the invention is used.

A manner of using the hose of the invention is shown in FIG. 4 as an example, in which A shows the hose floating on the sea. When loading or unloading of oil is finished, the air in the space 3 is sucked out or replaced with water, then the hose is submerged underneath the sea level as shown at B. When it is required to float the hose on the sea level, air is delivered into the space 3 or the water in the space 3 is replaced with air.

Thus, there are two methods for carrying out the invention, one of which is to feed or discharge water into or out of the space 3 and by replacing the water with air, whilst the other is to feed or suck out air into or out of the space 3. In the latter case, the outer hose, i.e., the floater 2 should be made sufficiently flexible to be deformable as shown for example by the dot and dash lines 2′ in FIG. 1 illustrating the case when the air in the space 3 is sufficiently sucked out. Then the oil in the inner hose 1 is forced out to a storage tank by means of water from city main or by sea water through a pump.

In FIG. 4, A represents the floater with hose in floating condition, B shows the hose and floater when submerged. A buoy 9 or float chamber contains a pump with the necessary controlling valves and other devices installed. It may have sufficient space for an operator for the necessary operation of replacing air and water or controlling the supply or suction of air. A ship 10, a flexible connecting hose 11, a joint box 12 and a stationary oil feed pipe 13 leading to the oil reservoir station on the wharf complete the structure shown in this figure.

What is claimed is:
1. A submergible and floatable hose pipe for transporting oil and other liquid comprising two coaxially positioned flexible hoses forming a sealed annular air space therebetween, each hose being made of rubber with reinforcing means therein so as to be flexible, the inner hose serving as a liquid carrier, the outer hose being flexible in case of effecting interchange between gas and liquid in the air space for the purpose of adjusting weight of the hose pipe and being flexible and deformable in case of sucking out gas from said air space for the purpose of adjusting volume of the hose pipe and serving to maintain said annular air space between said hoses thereby forming a floatation means, a coupling means on each end of said hose pipe comprising a sleeve connected to the end of inner hose and a flange to be connected to the flange of other hose pipe, and means for introducing fluid into the air space between the hoses, the buoyance of said hose pipe being controlled by selectively introducing a fluid into air space and sucking out it therefrom.

2. A hose pipe in accordance wtih claim 1 wherein said coupling means further comprises two coaxially positioned sleeves, the inner sleeve being connected to the end of the inner hose and the outer sleeve being connected to the end of outer hose, said connecting flange being welded to said sleeves and having orifices therein forming the means for selectively conducting a fluid into and out of said airspace between the hoses.

3. A hose pipe in accordance with claim 1 wherein said means for introducing fluid to the airspace between the hoses consists of pipes provided between the inner and outer hoses.

4. A submergible and floatable hose pipe for transporting oil and other liquids comprising two coaxially positioned flexible hoses forming an annular air space therebetween by sealing the ends of said hoses to each other thereby forming an annular seal therebetween, each said hose being made of rubber with reinforcing means therein so as to be flexible, the inner hose serving as a liquid carrier, the outer hose being deformable and serving to maintain said annular air space between said hoses thereby forming a floatation means, coupling means on each end of said hose pipe comprising a sleeve connected to the end of the inner hose and a connecting flange, and pipe means provided for introducing a fluid medium into the air space between the inner hose and the outer deformable hose, the buoyancy of said hose pipe being controlled by selectively introducing said fluid medium into said air space and withdrawing therefrom.

References Cited
UNITED STATES PATENTS

| 2,419,053 | 4/1947 | Bennett. | |
| 3,117,596 | 1/1964 | Kahn | 138—111 X |
| 3,311,132 | 3/1967 | McWilliams | 138—111 |

LOUIS K. RIMRODT, *Primary Examiner.*

U.S. Cl. X.R.
138—148; 137—236; 9—8